J. H. RANKIN.
Corn Planter.

No. 30,836.   Patented Dec. 4, 1860.

Witnesses:
Geo. Ryburn
Geo. K. Stittinan

Inventor:
J. H. Rankin
By am Pekul & Co Attys
pr Wm Clough Solicitor

UNITED STATES PATENT OFFICE.

JOHN H. RANKIN, OF VERSAILLES, MISSOURI.

IMPROVEMENT IN CORN-PLANTERS.

Specification forming part of Letters Patent No. 30,836, dated December 4, 1860.

*To all whom it may concern:*

Be it known that I, JOHN H. RANKIN, of Versailles, Morgan county, and State of Missouri, have invented a new and useful Improvement in Corn-Planters; and I hereby declare the following to be a full, clear, and exact description of the same, reference being had to the accompanying drawings and letters of reference marked thereon, which form part of this specification.

My invention relates to the apparatus for distributing the seed, and to the manner of operating such apparatus.

Figure 1:
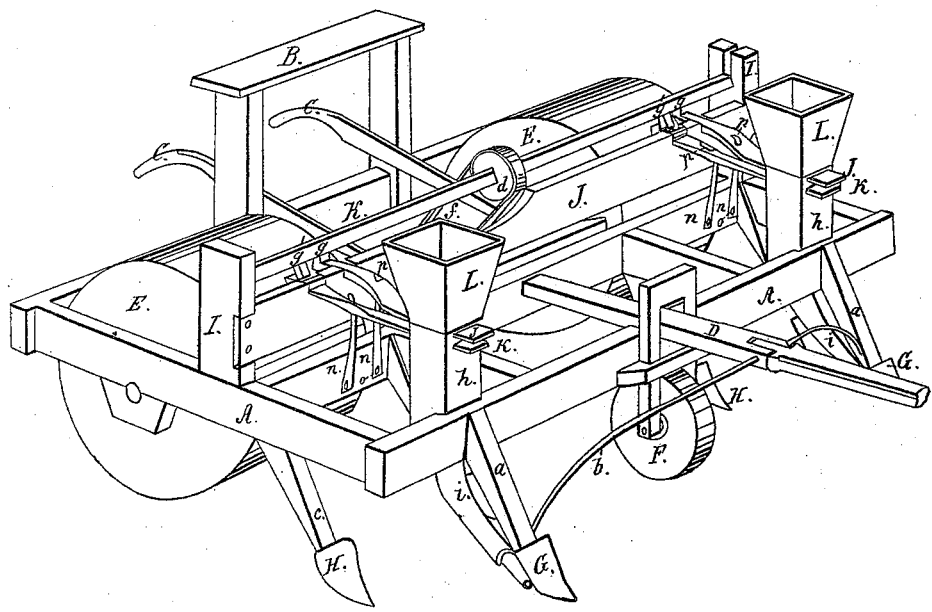
Figure 2:
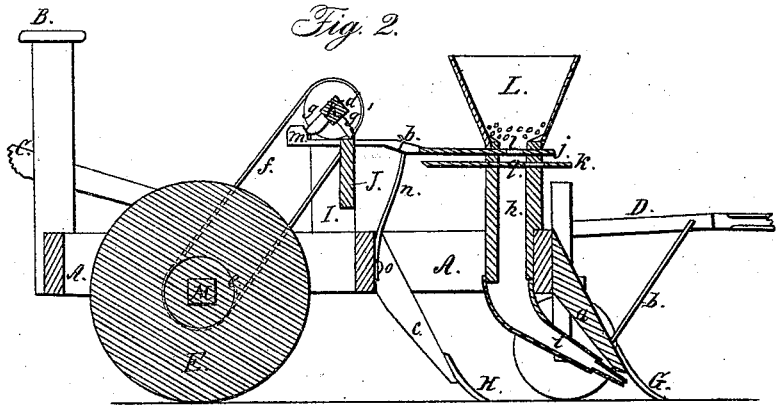

In the accompanying drawings, Figure 1 is a perspective view of the planter. Fig. 2 is a vertical longitudinal section through the seed-distributing apparatus.

Like letters of reference designate like parts in both drawings.

A is the body of the planter.

B is an elevated seat at the rear of the same for the driver.

C C are handles for guiding the implement when the driver does not choose to occupy the seat.

D is the draft beam or pole. E E are the traction-wheels, in form of broad rollers, which may be constructed of cast-iron, in the form of hollow cylinders appropriately attached to the axle.

F is a small auxiliary broad-fellied wheel, for maintaining the implement horizontally. This wheel may likewise be constructed of cast-iron.

G G are two excavating or furrowing shovels, attached to arms $a$, which proceed obliquely downward and forward from the front beam of the body A. An iron stay-rod, $b$, passes through the draft-beam, and is connected with the arms $a$ on each side.

H H H H are four covering-shovels, placed in pairs behind the excavators above described, one on each side, and attached to arms $c$, which proceed obliquely downward and forward from the middle beams of the body A.

I I are two uprights, attached to the side beams of the body A, and connected by a cross-piece, J.

K is a shaft, revolving in proper grooves or journal-rests in the uprights I. In the center this shaft is furnished with a drum, $d$, and the shaft or axle M of traction-wheels E is furnished with a corresponding drum, $e$. The two drums are connected by a belt, $f$. Near each end of the shaft K two short arms, $g\ g'$, jut out. They are placed a short distance apart laterally and at right angles to each other radially.

L L are two seed boxes or hoppers, with their necks $h\ h$ attached to front beam of body A, and their discharge-pipes $i\ i$ terminating immediately behind the excavating-shovels G G. These seed boxes or hoppers are closed at bottom, each by two horizontal reciprocating valves, $j\ k$, arranged the one above the other, with a small intervening space, $q$. These valves slide or reciprocate in slots in the neck of the hopper. As these two seed-hoppers with their appendages are duplicates of each other, I shall, for the sake of greater perspicuity in my further descriptions, speak as though there was only one. The valves $j$ and $k$ are each perforated near their front extremities by a circular aperture, $l$. A backward prolongation of each valve likewise passes through a slot in the cross-piece J and terminates in a hook or catch, $m$. A spring, $n$, fastened at one end, $o$, to the middle beam of the body A, passes through each of the valves in their backward prolongations at $p$.

The general operation of the planter being obvious, and not entirely novel, may be indicated in few words. The implement being put in forward motion by the horses harnessed thereto, the shovels G at each side excavate a furrow, into which seed is dropped at intervals from the seed-boxes L. The covering-shovels H then pass on, covering up the seed deposited; and, lastly, the rollers E pass over the light covering of earth, pressing it down, and thus completing the operation.

The operation of the seed-distributing apparatus is as follows: By means of the springs $n$, which exert their pressure in a forward direction, the valves $j$ and $k$ are kept closed. Now, the hoppers being filled with seed and the planter put in motion, the shaft K begins to revolve by reason of the belt $f$ passing round the drums $e$ and $f$, respectively, belonging to traction-wheel axle M and shaft K. As this shaft revolves one of the arms, $g$, encounters the hook $m$ on the end of valve $j$, drawing it backward, so that the aperture $l$ comes under the seed, permitting a small portion to fall into the space $q$ between the two valves. As soon as the arm $g$, by its revolution, has lost its hold of the catch m, the spring n forces the valve j into its originally closed position. At the same time the arm g' encounters the hook m of valve k, drawing it back in a similar manner to the first, and permitting the seed in the space q to be discharged by the aperture l into the neck h and discharge-pipe i, by which it is deposited in the ground. This reciprocation of alternate valves goes on at each revolution of the shaft K, resulting each time in the separation of a definite quantity of seed from the mass in the hopper and its deposit in the earth. It is evident that the distance between the "hills" or places of deposit may be varied by varying the relative sizes of the drums e and f.

Having described my invention, I proceed to state what I claim and what I wish by Letters Patent to secure—

The valves j k, springs n, shaft K, and arms g g', when arranged and operating together, substantially in the manner and for the purpose described.

JOHN H. RANKIN.

Witnesses:
WM. C. SEVIER,
W. J. TULL.